US009701342B2

(12) United States Patent
Goellner et al.

(10) Patent No.: US 9,701,342 B2
(45) Date of Patent: Jul. 11, 2017

(54) VEHICLE SUSPENSION SYSTEM, SUSPENSION MOUNT ASSEMBLY AND METHOD OF MOUNTING A SUBFRAME TO A FRAME

(71) Applicant: Honda Motor Co., Ltd., Minato-ku, Tokyo (JP)

(72) Inventors: Adam Goellner, Marysville, OH (US); Derek Horton, Marysville, OH (US); Keith Malarik, Delaware, OH (US); Martyn Morrish, Dublin, OH (US); Charles Gagliano, Hilliard, OH (US); Michael Gebrian, Dublin, OH (US); Aaron Wright, Ostrander, OH (US); Paul Martino, Columbus, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 113 days.

(21) Appl. No.: 14/675,015

(22) Filed: Mar. 31, 2015

(65) Prior Publication Data

US 2016/0288834 A1 Oct. 6, 2016

(51) Int. Cl.

| | |
|---|---|
| ***B60G 7/02*** | (2006.01) |
| ***B62D 21/11*** | (2006.01) |
| ***F16F 1/38*** | (2006.01) |

(52) U.S. Cl.

CPC ............ *B62D 21/11* (2013.01); *F16F 1/3842* (2013.01)

(58) Field of Classification Search

CPC ........................ B62D 21/155; Y10T 29/49622

USPC .......................... 280/124.109, 781, 784, 785

See application file for complete search history.

(56) References Cited

U.S. PATENT DOCUMENTS

| | | | | |
|---|---|---|---|---|
| 5,567,005 A | 10/1996 | Kosuge et al. | | |
| 6,679,523 B2 | 1/2004 | Yamamoto et al. | | |
| 6,783,157 B2 * | 8/2004 | Huang | B60G 7/02 | 280/124.109 |
| 6,869,090 B2 * | 3/2005 | Tatsumi | B60G 3/20 | 280/124.109 |
| 7,380,856 B2 | 6/2008 | Kobayashi et al. | | |
| 7,393,016 B2 * | 7/2008 | Mitsui | B62D 25/08 | 180/232 |
| 7,654,543 B2 * | 2/2010 | Tanaka | B60G 7/02 | 180/312 |
| 7,771,137 B2 * | 8/2010 | Anzai | B62D 21/11 | 180/232 |
| 8,308,193 B2 | 11/2012 | Lux et al. | | |
| 8,480,165 B2 | 7/2013 | Koyama et al. | | |
| 8,613,461 B2 * | 12/2013 | Young | B62D 21/155 | 280/124.109 |
| 8,646,792 B2 * | 2/2014 | Young | B62D 21/155 | 280/124.109 |
| 8,684,382 B2 * | 4/2014 | Buschjohann | B62D 21/11 | 180/311 |

(Continued)

*Primary Examiner* — Toan C To

(74) *Attorney, Agent, or Firm* — Arent Fox LLP

(57) ABSTRACT

A suspension mount assembly for mounting a subframe to a frame of a vehicle having a frame rail is provided. The suspension mount assembly includes a cross member and a stay. The cross member is coupled to the frame rail and at least partially defines a recess. The subframe includes a distal end at least partially positioned within the recess at a mounting point defined along a central axis of the recess. The stay couples the cross member to the frame rail and retains the subframe at least partially positioned within the recess at the mounting point.

20 Claims, 6 Drawing Sheets

150 120 122 130 134 138 164 126 102 155 178 180 148 144 140 136 174 108 146 132 A B 170 184 164 136 100 142 164 154 170 176 128 172 182 156 153 152 162 162 158 160 160 158 151 124 158 162 160

(56) References Cited

U.S. PATENT DOCUMENTS

| | | | | |
|---|---|---|---|---|
| 9,010,849 | B2 * | 4/2015 | Komiya | B62D 21/11 280/124.109 |
| 9,016,424 | B2 * | 4/2015 | Awano | B62D 3/12 180/274 |
| 2005/0046215 | A1 | 3/2005 | Chung | |
| 2011/0115258 | A1 | 5/2011 | Ohhama et al. | |
| 2012/0056448 | A1 | 3/2012 | Takahashi | |
| 2012/0326410 | A1 | 12/2012 | West et al. | |
| 2013/0181485 | A1 | 7/2013 | Rumpel et al. | |
| 2014/0252739 | A1 * | 9/2014 | Otani | B62D 21/155 280/124.109 |
| 2015/0217808 | A1 * | 8/2015 | Haselhorst | B62D 21/11 280/124.109 |

* cited by examiner

VEHICLE SUSPENSION SYSTEM, SUSPENSION MOUNT ASSEMBLY AND METHOD OF MOUNTING A SUBFRAME TO A FRAME

BACKGROUND

The subject matter disclosed herein relates to a vehicle suspension system and, more particularly, to a vehicle suspension mount assembly and a method of mounting a subframe to a frame of a vehicle.

Vehicle performance may have a significant impact on an operator's perceived value and experience. The configuration or geometry of the vehicle suspension system can have a significant effect on the overall dynamic performance of the vehicle. The mechanism for mounting the suspension system to the frame of the vehicle is one variable that can change the available geometries and the ability to mount components to the vehicle frame.

In many conventional vehicles, the suspension system is mounted directly to the vehicle frame. Alternatively, at least some known suspension systems are coupled to a subframe which is then mounted to the vehicle frame. In addition to the geometry of a particular suspension system, the stiffness and the weight of the mounting technique may play an important role in determining the performance of a vehicle. The stiffness and the weight of the mounting mechanism are factors that may be controlled along with the system geometry to increase the vehicle performance.

A suspension mount assembly for a vehicle suspension system that increases the available suspension geometries and provides flexibility in arranging the suspension system components, as well as decreasing the weight of the vehicle suspension system and maintaining or increasing the desired lateral stiffness and/or vertical stiffness of the suspension system is desired.

SUMMARY

According to one aspect, a suspension mount assembly for mounting a subframe to a frame of a vehicle having a frame rail includes a cross member and a stay. The cross member is coupled to the frame rail and at least partially defines a recess. A distal end of the subframe is at least partially positioned within the recess at a mounting point defined along a central axis of the recess. The stay couples the cross member to the frame rail and retains the subframe at least partially positioned within the recess at the mounting point.

According to another aspect, a vehicle suspension system includes a frame rail. A cross member is coupled to the frame rail to at least partially define a recess having a central axis. A subframe has a distal end that is at least partially positioned within the recess at a mounting point defined along the central axis of the recess. A stay couples the cross member to the frame rail and retains the subframe at least partially positioned within the recess and aligned with the mounting point.

According to a further aspect, a method for mounting a subframe to a frame of a vehicle having a frame rail is provided. The method includes coupling a cross member to the frame rail to at least partially define a recess. A distal end of the subframe is at least partially positioned within the recess at a mounting point defined along a central axis of the recess.

BRIEF DESCRIPTION OF THE DRAWINGS

Other aspects and advantages of certain embodiments will become apparent upon consideration of the following detailed description, wherein similar structures have similar reference numerals.

DETAILED DESCRIPTION

Figure 1:
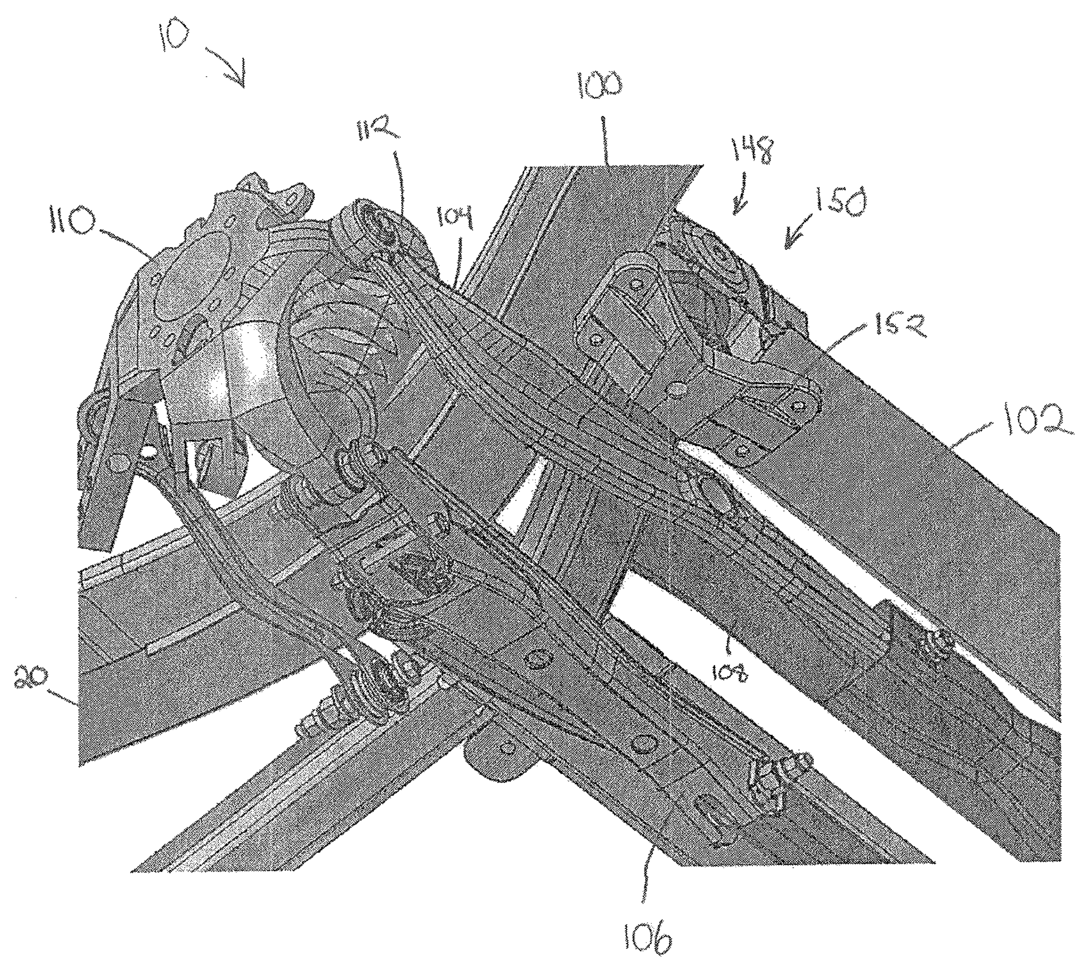
FIG. 1 is an isometric view of an exemplary vehicle suspension system.
Figure 2:
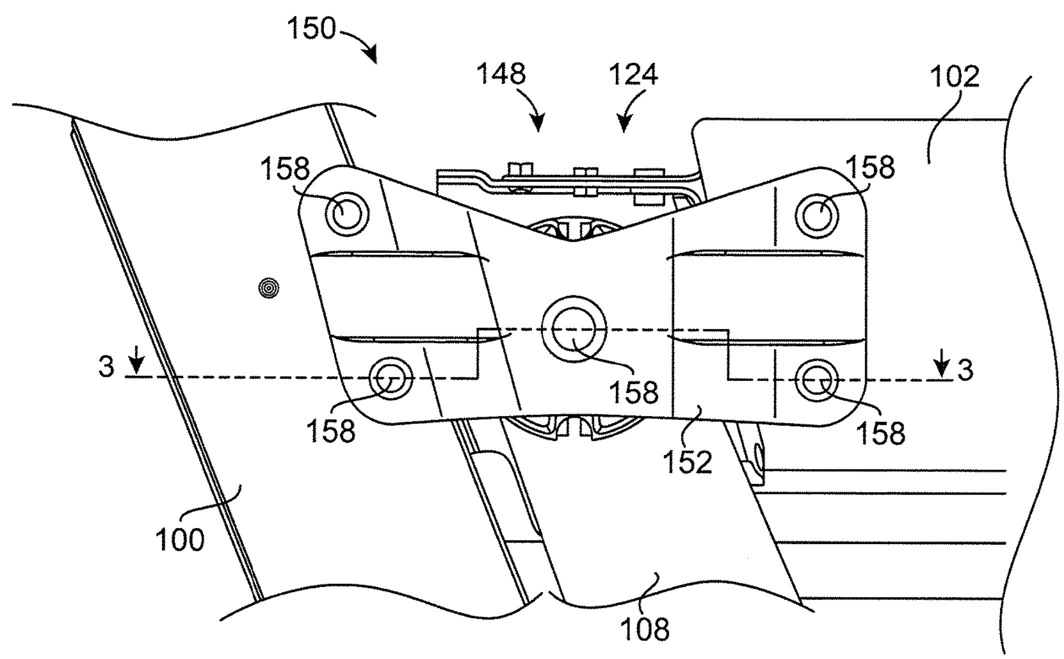
FIG. 2 is a bottom view of an exemplary vehicle suspension mount assembly suitable for use with the vehicle suspension system shown in FIG. 1.
Figure 3:
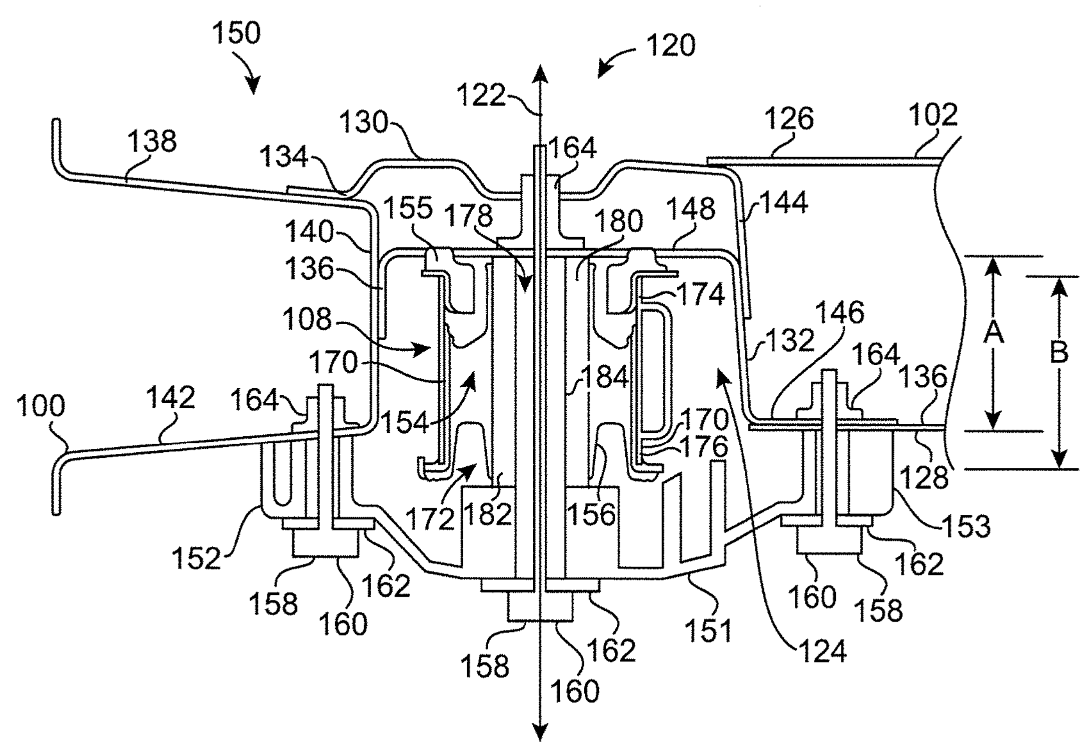
FIG. 3 is a cross-sectional view of the vehicle suspension mount assembly shown in FIG. 2 taken along the sectional line 3-3.

Referring initially to FIG. 1, a portion of a suspension system 10 for a motor vehicle (not shown) is depicted. The motor vehicle includes a frame 20, a portion of which is depicted in FIG. 1. In one embodiment, frame 20 includes a frame rail 100 and a cross member 102. Frame 20 includes other components, some of which are shown in FIGS. 1-3 but not described in the present disclosure but known to those having ordinary skill in the art. For the purpose of illustrating various embodiments, only some of the frame components are described herein. Further, the portion of suspension system 10 depicted in FIG. 1 includes only components for one suspension mount assembly as described herein, located at or near a passenger-side rear wheel. One having ordinary skill in the art would recognize that suspension system 10 includes similar or alternative components operatively coupled to frame 20 at or near mounting points for one or more additional wheels, for example, the opposing driver-side rear wheel, not necessarily depicted in FIGS. 1-3.

Still referring to FIG. 1, the depicted portion of suspension system 10 further includes an upper control arm 104 and a lower control arm 106. In certain embodiments, upper control arm 104 and lower control arm 106 are operatively coupled to a subframe 108. Upper control arm 104 and lower control arm 106 may also be operatively coupled to a hub 110. Suspension system 10 may also include a spring 112. One having ordinary skill in the art will recognize that suspension systems may include many different configurations and elements.

With further reference to FIGS. 1-3, subframe 108 is connected to frame 20 at a mounting point 120 defined on or along a central axis 122, shown in FIG. 3. Cross member 102 is coupled to frame rail 100 to at least partially define a recess 124 coaxially positioned with mounting point 120 about central axis 122. In one embodiment, cross member 102 includes a first or upper portion 126 and a generally opposing second or lower portion 128. Cross member 102 includes lateral walls coupled to, such as integrally formed with, each of upper portion 126 and lower portion 128 to form cross member 102 having a generally rectangular cross-sectional area.

In one embodiment, a first or upper plate 130 and a second or lower plate 132, as shown in FIG. 3, are each coupled to cross member 102, such as by a suitable welding technique, and extend from cross member 102 to couple cross member 102 to frame rail 100 and at least partially define recess 124. In the embodiment shown in FIG. 3, upper plate 130 forms a flange 134 and lower plate 132 forms a flange 136 to facilitate coupling cross member 102 to frame rail 100.

In the embodiment shown in FIG. 3, frame rail 100 includes an upper portion 138, a central portion 140, and a lower portion 142. In this embodiment, upper plate 130 is coupled to upper portion 138 of frame rail 100 at flange 134 and upper portion 126 of cross member 102. As shown in FIG. 3, lower plate 132 of cross member 102 is coupled to central portion 140 of frame rail 100 at flange 136 and to a downwardly extending flange 144 of upper plate 130. A flange 146 of lower plate 132 is coupled to an inner surface of lower portion 128 of cross member 102. In a particular embodiment, with cross member 102 coupled to frame rail 100, flange 136 and flange 146 of lower plate 132 extend from a central portion 148 of lower plate 132 to at least partially define recess 124. Further, the coupling of subframe 102 to frame rail 100 may be accomplished by any number of means including, without limitation, welding, riveting, brazing, and adhesives, or any other suitable means or combinations of means known by one having ordinary skill in the art. In alternative embodiments, cross member 102 is coupled to frame rail 100 at additional or alternative locations using suitable coupling mechanisms and techniques to at least partially define recess 124.

In one embodiment, a distal end 148 of subframe 108 is at least partially retained within recess 124 by an exemplary suspension mount assembly 150. Suspension mount assembly 150 includes a stay 151 and an isolator 154 positioned at least partially within recess 124. In the embodiment shown, stay 151 is made of a suitable material including, without limitation, cast aluminum, cast steel, or stamped steel.

As shown in FIG. 3, in certain embodiments isolator 154 include a first isolator member 155 and a second isolator member 156, as described in greater detail below. Stay 151 is coupled to frame rail 100 and cross member 102 using suitable coupling mechanisms, such as one or more fastener assemblies 158. As shown in FIG. 3, each fastener assembly 158 includes a bolt 160, a washer 162 and a captured nut 164. One or more fastener assemblies 158 are employed to couple a first side 152 of stay 151 to lower portion 142 of frame rail 100 and one or more fastener assemblies 158 are employed to couple an opposing second side 153 of stay 151 to lower portion 128 of cross member 102. Referring further to FIG. 3, in one embodiment, one fastener assembly 158 extends through stay 151 and recess 124 along central axis 122 to couple stay 151 to lower plate 132 and/or upper plate 130 of cross member 102 at mounting point 120. In alternative embodiments, suspension mount assembly 150 is coupled to frame rail 100 and cross member 102 at mounting point 120 using any suitable coupling means known to those having ordinary skill in the art.

Referring further to FIG. 3, in one embodiment subframe 108 has an inner cylindrical wall 170. In this embodiment, inner cylindrical wall 170 defines an opening 172 between a distal end 174 and an opposing proximal end 176. As shown in FIG. 3, first isolator member 155 is positioned about at least a portion of distal end 174 of inner cylindrical wall 170 and at least partially disposed between subframe 108 and cross member 102. In addition or alternatively, second isolator member 156 is positioned about proximal end 176 of inner cylindrical wall 170 and within opening 172. Second isolator member 156 extends along at least a portion of the length of inner cylindrical wall 170 from proximal end 176 toward distal end 174 to define a passage 178. Passage 178 extends between a proximal end 180 of second isolator member 156 and a distal end 182 of second isolator member 156. In the embodiment shown in FIG. 3, a collar 184 is positioned within passage 178. In certain embodiments, second isolator member 156, stay 151, and subframe 108 are aligned so collar 184 is coaxially aligned with passage 178 along central axis 122 at mounting point 120. The associated fastener assembly 158 extends through recess 124 at mounting point 120 defined on or along central axis 122 to couple stay 151 to lower plate 132 and/or upper plate 130 of cross member 102 to maintain passage 178 and collar 184 coaxially aligned at mounting point 120.

As shown in FIG. 2, for example, stay 151 is also coupled to lower portion 142 of frame rail 100 and lower portion 128 of cross member 102 in certain embodiments. In alternative embodiments, stay 151 is coupled to frame rail 100 and/or cross member 102 in additional or alternative locations and/or coupled to other components of the vehicle frame to maintain subassembly 108 properly positioned within recess 124. More specifically, in the embodiment shown in FIGS. 1-3 stay. 151 retains distal end 148 of subframe 108 at least partially positioned within recess 124.

Referring again to FIG. 3, a depth of recess 124 is indicated by a dimension A and a height of subframe 108 at distal end 148 is indicated by a dimension B. In one embodiment, depth A of recess 124 is at least 10 millimeters (mm), such as 10 mm to 150 mm or, more specifically, 20 mm to 100 mm, or, even more specifically, 35 mm to 75 mm and all subranges therebetween, and height B of subframe 108 is at least 20 mm, such as 20 mm to 100 mm or, more specifically, 35 mm to85 mm, or, even more specifically, 50 mm to 70 mm and all subranges therebetween. As shown in FIG. 3, at least a portion of, and in certain embodiments a majority of height B of subframe 108 at distal end 148 is positioned within recess 124. In certain embodiments, one or more properties of suspension mount assembly 150, including for example a vertical stiffness and/or a lateral stiffness, may be optimized for a specific or desired application by controlling depth A of recess 124 and/or a portion of height B of subframe 108 positioned within recess 124 and above lower portion 142 of frame rail 100.

Figure 4:
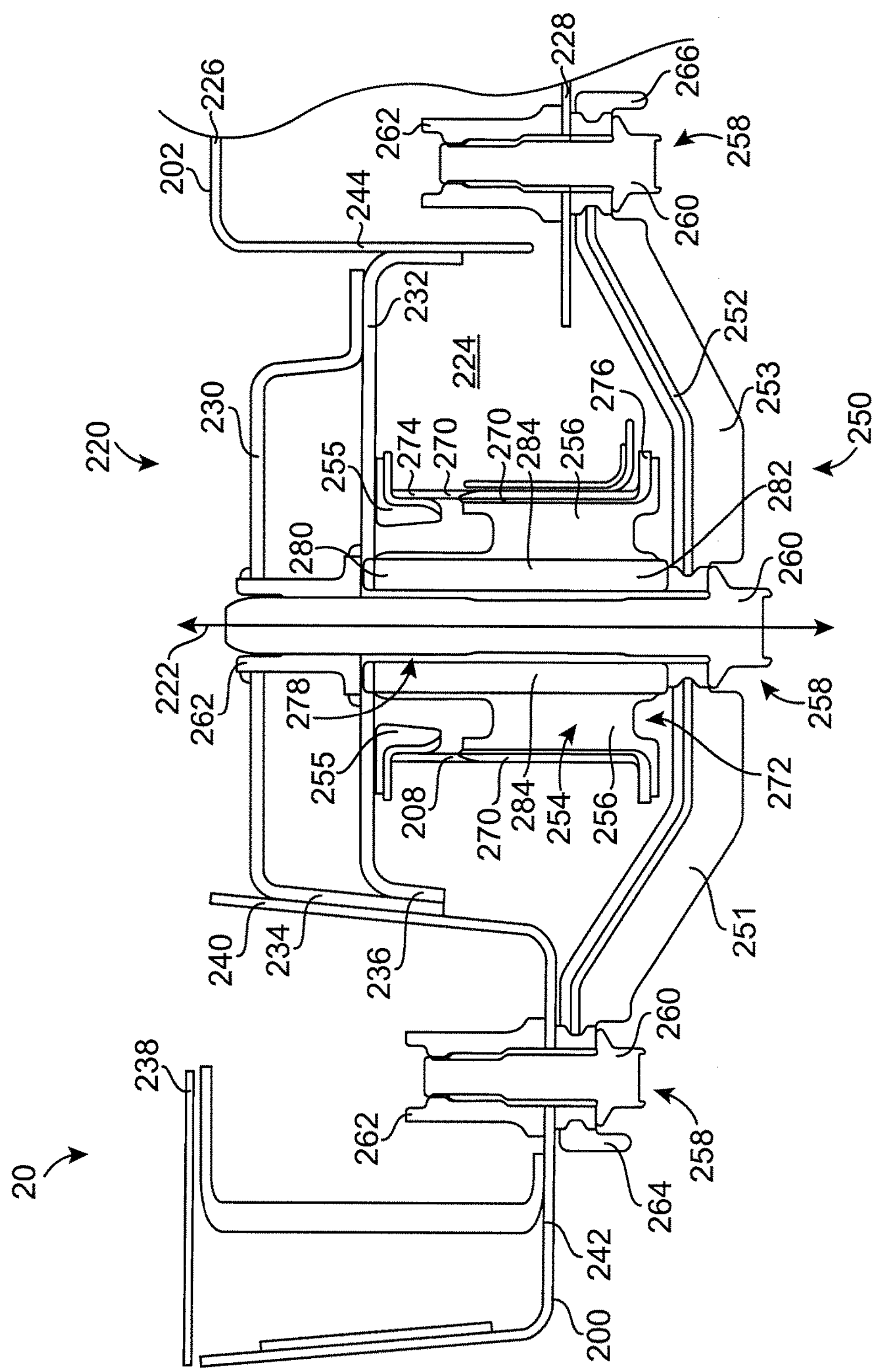
FIG. 4 is a cross-sectional view of another embodiment of an exemplary vehicle suspension mount assembly.

Referring now to FIG. 4, a cross-sectional view of another embodiment of an exemplary vehicle suspension mount assembly is depicted. In the embodiment depicted, the portion of frame 20 shown includes a frame rail 200 and a cross member 202. A subframe 208 is connected to frame 20 at a mounting point 220 defined on or along an axis 222. Cross member 202 is coupled to frame rail 200 to at least partially define a recess 224 coaxially positioned with mounting point 220 about axis 222. In one embodiment, cross member 202 includes a first or upper portion 226 and a generally opposing second or lower portion 228. Cross member 202 includes lateral walls coupled to, such as integrally formed with, each of upper portion 226 and lower portion 228 to form cross member 202 having a generally rectangular cross-sectional area.

As shown in FIG. 4, a first or upper plate 230 and a second or lower plate 232 at least partially define recess 224. Lower plate 232 is coupled to cross member 202, such as by a suitable welding technique, and extends from cross member 202 to couple cross member 202 to frame rail 200. Upper plate 230 is coupled to frame rail 200 and lower plate 232 to provide improved stiffness to mounting 220. In the embodiment shown in FIG. 4, upper plate 230 forms a flange 234 and lower plate 232 forms a flange 236 to facilitate coupling cross member 202 to frame rail 200.

Referring further to FIG. 4, frame rail 200 includes an upper portion 238, a central portion 240, and a lower portion 242. In this embodiment, upper plate 230 and lower plate 232 are coupled to central portion 234 of frame rail 200 at flanges 234, 236. Lower plate 232 of cross member 202 is also coupled to a downwardly extending flange 244 of cross member 202. In a particular embodiment, with cross member 202 coupled to frame rail 200, lower plate 232 at least partially defines recess 224. Further, the coupling of subframe 202 to frame rail 200 may be accomplished by any number of means including, without limitation, welding, riveting, brazing, and adhesives, or any other suitable means or combinations of means known by one having ordinary skill in the art.

Still referring to FIG. 4, a distal end (not shown) of subframe 208 is at least partially retained within recess 224 by an exemplary suspension mount assembly 250. Suspension mount assembly 250 includes a stay 251 and an isolator 254 positioned at least partially within recess 224. In the embodiment shown, stay 151 is made of a metal insert 252 with a resin overmold 253. In this embodiment, stay 251 allows for a further decrease in weight of the overall suspension system and further increase in lateral and/or vertical stiffness.

As shown in FIG. 4, in certain embodiments isolator 254 include a first isolator member 255 and a second isolator member 256, as described in greater detail below. Stay 251 is coupled to frame rail 200 and cross member 202 using suitable coupling mechanisms, such as one or more fastener assemblies 258. Each fastener assembly 258 includes a bolt 260 and a captured nut 262. One or more fastener assemblies 258 are employed to couple a first side 264 of stay 251 to lower portion 242 of frame rail 200 and one or more fastener assemblies 258 are employed to couple an opposing second side 266 of stay 251 to lower portion 228 of cross member 202. Referring further to FIG. 4, in one embodiment, one fastener assembly 258 extends through stay 251 and recess 224 along axis 222 to couple stay 251 to lower plate 232 and/or upper plate 230 of cross member 202 at mounting point 220.

Referring further to FIG. 4, in one embodiment subframe 208 has an inner cylindrical wall 270. In this embodiment, inner cylindrical wall 270 defines an opening 272 between a distal end 274 and an opposing proximal end 276. As shown in FIG. 4, first isolator member 255 is positioned about at least a portion of distal end 274 of inner cylindrical wall 270 and at least partially disposed between subframe 208 and cross member 202. In addition or alternatively, second isolator member 256 is positioned about proximal end 276 of inner cylindrical wall 270 and within opening 272. Second isolator member 256 extends along at least a portion of the length of inner cylindrical wall 270 from proximal end 276 toward distal end 274 to define a passage 278. Passage 278 extends between a proximal end 280 of second isolator member 256 and a distal end 282 of second isolator member 256. In the embodiment shown in FIG. 4, a collar 284 is positioned within passage 278. In certain embodiments, second isolator member 256, stay 251, and subframe 208 are aligned so collar 284 is coaxially aligned with passage 278 along axis 222 at mounting point 220. The associated fastener assembly 258 extends through recess 224 at mounting point 220 defined on or along axis 222 to couple stay 251 to lower plate 232 and/or upper plate 230 of cross member 202 to maintain passage 278 and collar 284 coaxially aligned at mounting point 220.

Figure 5:
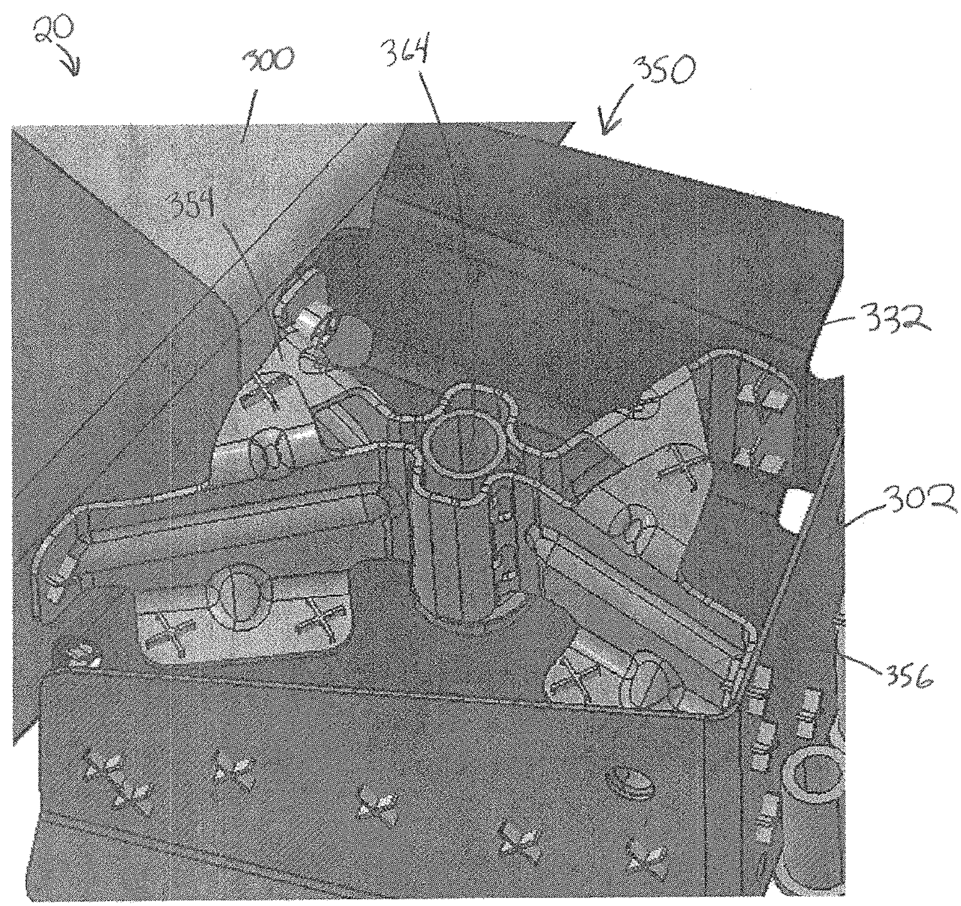
FIG. 5 is an isometric view of an alternative embodiment of an exemplary vehicle suspension mount assembly.

Now referring to FIG. 5, a portion of an exemplary vehicle suspension mount assembly is depicted. In the embodiment of FIG. 5, frame 20 includes a frame rail 300 and a cross member 302. Cross member 302 depicted includes a lower plate 332. FIG. 5 depicts a suspension mount assembly 350 from above and an upper plate 130, 230 as shown in the earlier embodiments is not shown. The portions of suspension mount assembly 350 below lower plate 332 may include any or all of the elements shown in the earlier embodiments. In the embodiment depicted in FIG. 5, suspension mount assembly 350 includes a first brace 354 and a second brace 356. Braces 354, 356 are coupled to frame rail 300, cross member 302, lower plate 332 and an upper plate (not shown). Braces 354, 356 are also configured to couple to a captured nut 364. Braces 354, 356 may be coupled to the surrounding structures and captured nut 364 by any suitable means including, without limitation, welding, riveting, brazing, and adhesives, or any suitable combination thereof known by one having ordinary skill in the art. The addition of first brace 354 and/or second brace 356 provides for an increase in stiffness of suspension mount assembly 350.

It is contemplated that braces 354, 356 depicted in FIG. 5 may take many different forms. In one alternative embodiment, a single brace structure may be present to couple frame rail 300, cross member 302, lower plate 332 and an upper plate (not shown) together and increase the stiffness of suspension mount assembly 350. In another embodiment, the brace structure above lower plate 332 may include a plurality of elements. The nature of bracing structures above the lower plate improve the stiffness of suspension mount assembly 350.

Figure 6:
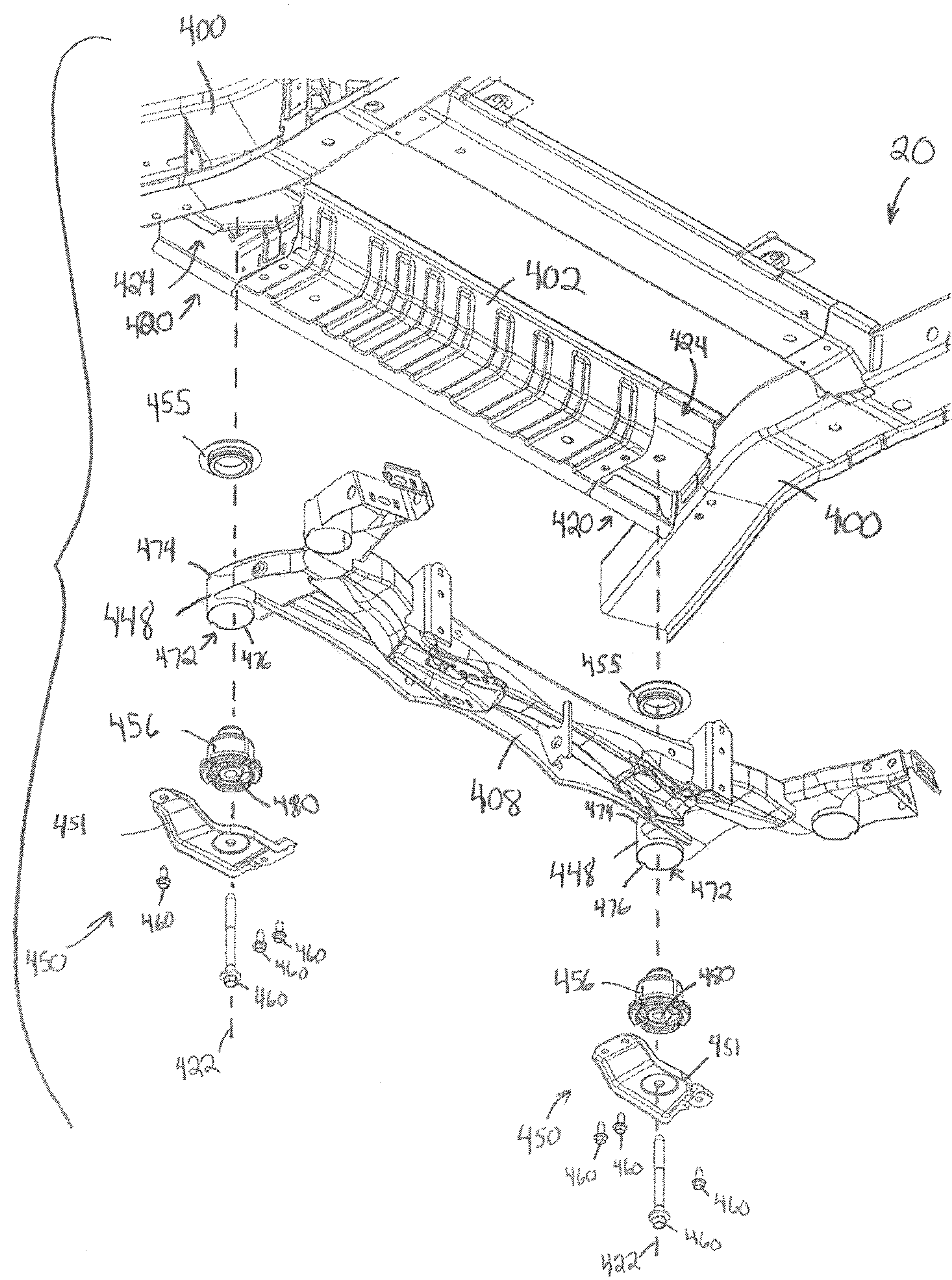
FIG. 6 is an exploded view of yet another embodiment of an exemplary vehicle suspension system.

An exploded view of another exemplary embodiment of a vehicle suspension mount assembly is depicted in FIG. 6. Frame 20 includes frame rails 400 coupled by a cross member 402. A subframe 408 is connected to frame 20 at a mounting point 420 defined on or along an axis 422. Cross member 402 is coupled to frame rails 400 to at least partially define recesses 424 coaxially positioned with mounting points 420 about an axis 422. Distal ends 448 of subframe 408 are at least partially retained within recesses 424 by exemplary suspension mount assemblies 450. Suspension mount assemblies 450 include stays 451 and first isolator members 455 and second isolator members 456 positioned at least partially within recesses 424. Stays 451 are coupled to frame rails 400 and cross member 402 using suitable coupling mechanisms, such as one or more bolts 460, which are retained by captured nuts (not shown) within frame rails 400 and cross member 402. Distal ends 448 of subframe 408 include openings 472. First isolator members 455 are positioned about distal ends 474 of openings 472 and at least partially disposed between subframe 408 and cross member 402. Second isolator members 456 are positioned about proximal ends 476 of openings 472. Second isolator members 456 include collars 480.

In the embodiment depicted in FIG. 6, second isolator members 456, stays 451, and subframe 408 are aligned so collar 484 is coaxially aligned with axis 422 at mounting point 220. The associated bolts 460 extend through recess 424 at mounting point 420 defined on or along axis 422 to couple stays 451 to cross member 402 to maintain collars 284 coaxially aligned at mounting point 420.

Some of the advantages that may be realized in the practice of at least some embodiments of the described assemblies, systems and techniques include an increased elevation of mounting point 120 with respect to a support surface, such as the ground or a road surface, compared to mounting positions in know suspension mount assemblies. More specifically, at least some conventional or known suspension mount assemblies include a subframe coupled to a bottom surface of the frame rails. Embodiments of the described assemblies, systems and techniques have advantageously positioned all or a portion of suspension mounting assembly 150 above lower portion 142 of frame rail 100. As described above, in certain embodiments, a majority of height B of subframe 108 at distal end 148 is positioned within recess 124. This advantageous position and associated structure increases a lateral stiffness of suspension mount assembly 150 and maintains a vertical stiffness of suspension mount assembly 150 over conventional suspension mount assemblies.

In certain embodiments, a lateral stiffness of suspension mount assembly 150 is at least 4,000 Newtons per millimeter (N/mm), such as 4,000 N/mm to 17,000 N/mm or, more specifically, 8,000 N/mm to 16,000 N/mm, or, even more specifically, 12,000 N/mm to 15,500 N/mm and all subranges therebetween, and a vertical stiffness of suspension mount assembly 150 is at least 2,000 N/mm, such as 2,000 N/mm to 10,000 N/mm or, more specifically, 3,000 N/mm to 8,000 N/mm, or, even more specifically, 3,500 N/mm to 5,000 N/mm and all subranges therebetween. Various simulation methods may be used to determine the stiffness, both laterally and vertically. In one embodiment, the lateral and vertical stiffness values can be calculated using a simulation employing an inertia relief method wherein a small load is applied to the middle of the mount assembly 150 and the reaction to the inertia of the mount assembly is used to calculate the values. The increase in lateral stiffness, while maintaining a desired or required vertical stiffness, has several advantages in addition to improving the dynamic performance of the vehicle. Subframe 108 may be reduced in size, which results in weight savings. Also, positioning distal end 148 of subframe 108 within recess 124 raises subframe 108 to provide additional area for other components of suspension system 10. This configuration provides design flexibility and allows for a wider variety of suspension system geometries.

It is contemplated that suitable materials used to produce one or more components of the suspension mount assembly may be known to one having ordinary skill in the art. For example, the components of frame rail 100 and cross member 102 may be constructed from suitable standard metals, such as the wide variety of steels available. Other examples of suitable materials that may be used include light weight aluminum or carbon fiber composites. Subframe 108, stay 151, and/or any structural components of suspension system 10 may be constructed of suitable materials know to one having ordinary skill in the art. Some examples include steel, aluminum, and carbon fiber composites. Further, suitable materials used to construct the isolator members include, without limitation, a variety of rubber and synthetic motion and vibration dampening materials, as well as other materials known to those having ordinary skill in the art. Also, while at least one of the described embodiments includes separate isolator members, it is contemplated that a single, unitary isolator made of any suitable rubber or other appropriate material may be employed in suspension mount assembly 150.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments.

What is claimed is:

1. A suspension mount assembly for mounting a subframe to a frame of a vehicle having a frame rail, the suspension mount assembly comprising:

a cross member coupled to the frame rail to at least partially define a recess, the subframe having a distal end at least partially positioned within the recess at a mounting point defined along a central axis of the recess; and a stay coupling the cross member to the frame rail, the stay retaining the subframe at least partially positioned within the recess at the mounting point.

2. The suspension mount assembly of claim 1, wherein the stay is coupled to each of the cross member, the frame rail, and the subframe to provide stiffness at the mounting point.

3. The suspension mount assembly of claim 1, wherein the subframe comprises an inner cylindrical wall coaxially aligned with the central axis of the recess and defining an opening, the suspension mount assembly further comprising an isolator positioned within the opening and defining a passage extending between a proximal end of the isolator and a distal end of the isolator.

4. The suspension mount assembly of claim 3 further comprising a fastener extending through the passage to couple the stay to the subframe.

5. The suspension mount assembly of claim 3, wherein the isolator comprises:

a first isolator member positioned about at least a portion of a distal end of the cylindrical wall of the subframe and at least partially disposed between the subframe and the cross member; and a second isolator member positioned about at least a portion of a proximal end of the cylindrical wall of the subframe and extending toward the distal end of the cylindrical wall, wherein the second isolator member defines the passage.

6. The suspension mount assembly of claim 5, wherein the second isolator member includes a collar positioned within the passage.

7. The suspension mount assembly of claim 1, wherein the subframe is positioned within the recess such that the subframe is located above a suspension of the vehicle.

8. The suspension mount assembly of claim 1, wherein at least one brace member couples the frame rail to portions of the cross member.

9. The suspension mount assembly of claim 8, wherein the at least one brace member couples at least one of an upper plate and a lower plate of the cross member to the frame rail.

10. The suspension mount assembly of claim 1, wherein a portion of the subframe is positioned above a lower portion of the frame rail.

11. The suspension mount assembly of claim 1, wherein at least half of a height of the subframe is positioned within the recess.

12. The suspension mount assembly of claim 1, wherein a depth of the recess is greater than 40 mm.

13. A vehicle suspension system comprising:

a frame rail;

a cross member coupled to the frame rail to at least partially define a recess having a central axis;

a subframe having a distal end at least partially positioned within the recess at a mounting point defined along the central axis of the recess; and a stay partially coupling the cross member to the frame rail, the stay retaining the subframe at least partially positioned within the recess and aligned with the mounting point.

14. The vehicle suspension system of claim 13, wherein the stay is coupled to each of the cross member, the frame rail, and the subframe to provide stiffness at the mounting point.

15. The vehicle suspension system of claim 13, wherein the subframe comprises an inner cylindrical wall coaxially aligned with the central axis of the recess and defining an opening, the suspension mount assembly further comprising:

an isolator positioned within the opening and defining a passage extending between a proximal end of the isolator and a distal end of the isolator; and a fastener extending through the passage to couple the stay to the subframe.

16. The vehicle suspension system of claim 15, wherein the isolator comprises:

a first isolator member positioned about at least a portion of a distal end of the cylindrical wall of the subframe and at least partially disposed between the subframe and the cross member; and a second isolator member positioned about at least a portion of a proximal end of the cylindrical wall of the subframe and extending toward the distal end of the cylindrical wall, wherein the second isolator member defines the passage.

17. A method for mounting a subframe to a frame of a vehicle having a frame rail, said method comprising:

coupling a cross member to the frame rail to at least partially define a recess;

positioning a distal end of the subframe within the recess; and retaining the distal end of the subframe at least partially positioned within the recess at a mounting point defined along a central axis of the recess.

18. The method of claim 17, wherein retaining the distal end of the subframe at least partially positioned within the recess comprises coupling a stay to the cross member, the subframe, and the frame rail to retain the subframe at least partially positioned within the recess.

19. The method of claim 17, wherein the subframe comprises an inner cylindrical wall coaxially aligned with the central axis of the recess and defining an opening, said method further comprising:

positioning an isolator within the opening, the isolator defining a passage extending between a proximal end of the isolator and a distal end of the isolator; and extending a fastener through the passage to couple the stay to the subframe.

20. The method of claim 19, wherein positioning an isolator within the opening comprises:

positioning a first isolator member about at least a portion of a distal end of the cylindrical wall of the subframe and at least partially disposed between the subframe and the cross member; and positioning a second isolator member about at least a proximal end of the cylindrical wall of the subframe and extending toward the distal end of the cylindrical wall, wherein the second isolator member defines the passage.

* * * * *